(12) United States Patent
Langhammer et al.

(10) Patent No.: US 11,080,019 B2
(45) Date of Patent: Aug. 3, 2021

(54) METHOD AND APPARATUS FOR PERFORMING SYNTHESIS FOR FIELD PROGRAMMABLE GATE ARRAY EMBEDDED FEATURE PLACEMENT

(71) Applicant: Intel Corporation, Santa Clara, CA (US)

(72) Inventors: Martin Langhammer, Alderbury (GB); Gregg William Baeckler, San Jose, CA (US); Sergey Gribok, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 445 days.

(21) Appl. No.: 16/022,857

(22) Filed: Jun. 29, 2018

(65) Prior Publication Data

US 2019/0042683 A1 Feb. 7, 2019

Related U.S. Application Data

(60) Provisional application No. 62/616,929, filed on Jan. 12, 2018.

(51) Int. Cl.
*G06F 7/53* (2006.01)
*G06F 30/34* (2020.01)
(Continued)

(52) U.S. Cl.
CPC .......... *G06F 7/5312* (2013.01); *G06F 7/5306* (2013.01); *G06F 7/5443* (2013.01); *G06F 30/327* (2020.01); *G06F 30/34* (2020.01); *G06F 30/392* (2020.01); *G06F 30/394* (2020.01); *G06N 20/00* (2019.01);
(Continued)

(58) Field of Classification Search
CPC ...... G06F 7/5312; G06F 30/34; G06F 30/327; G06F 30/392; G06F 30/394; G06F 7/5306; G06F 7/5443; G06F 2111/04; G06F 2111/20; G06F 2119/12; G06N 20/00
See application file for complete search history.

(56) References Cited

U.S. PATENT DOCUMENTS 6,295,633 B1 * 9/2001 Murakawa ............ G06F 30/392
716/124
6,438,735 B1 * 8/2002 McElvain ............. G06F 30/392
716/103
(Continued)

*Primary Examiner* — Stacy Whitmore

(57) ABSTRACT

A method for designing and configuring a system on a field programmable gate array (FPGA) is disclosed. A portion of the system that is implemented greater than a predetermined number of times is identified. A structural netlist that describes how to implement the portion of the system a plurality of times on the FPGA and that leverages a repetitive nature of implementing the portion is generated. The identifying and generating is performed prior to synthesizing and placing other portions of the system that are not implemented greater than the predetermined number of time. Synthesizing, placing, and routing the other portions of the system on the FPGA is performed in accordance with the structural netlist. The FPGA is configured with a configuration file that includes a design for the system that reflects the synthesizing, placing, and routing, wherein the configuring physically transforms resources on the FPGA to implement the system.

23 Claims, 13 Drawing Sheets

(51) Int. Cl.
  G06F 30/327 (2020.01)
  G06F 30/392 (2020.01)
  G06F 30/394 (2020.01)
  G06F 7/544 (2006.01)
  G06N 20/00 (2019.01)
  G06F 111/04 (2020.01)
  G06F 111/20 (2020.01)
  G06F 119/12 (2020.01)

(52) U.S. Cl.
  CPC ....... *G06F 2111/04* (2020.01); *G06F 2111/20* (2020.01); *G06F 2119/12* (2020.01)

(56) References Cited

U.S. PATENT DOCUMENTS

| | | | |
|---|---|---|---|
| 8,661,380 B1* | 2/2014 | Baeckler | G06F 30/34 |
| | | | 716/104 |
| 10,417,374 B1* | 9/2019 | Iyer | G06F 30/327 |
| 10,691,856 B1* | 6/2020 | Lysaght | G06F 30/392 |
| 10,936,772 B1* | 3/2021 | Iyer | G06F 30/327 |
| 10,956,241 B1* | 3/2021 | Neema | G06F 21/53 |
| 2006/0230375 A1* | 10/2006 | Casey | G06F 30/392 |
| | | | 716/117 |
| 2012/0005643 A1* | 1/2012 | Schroeder | G06F 30/392 |
| | | | 716/119 |
| 2013/0212365 A1* | 8/2013 | Chen | G06F 30/34 |
| | | | 713/1 |
| 2016/0335383 A1* | 11/2016 | Yao | G06F 30/34 |
| 2017/0272077 A1* | 9/2017 | Sharma | G06F 30/327 |
| 2018/0101624 A1* | 4/2018 | Dhar | G06F 30/392 |
| 2018/0218103 A1* | 8/2018 | Weber | G06F 30/327 |
| 2020/0074348 A1* | 3/2020 | Chelian | G06N 20/00 |
| 2021/0100103 A1* | 4/2021 | Chung | H01L 28/60 |

* cited by examiner

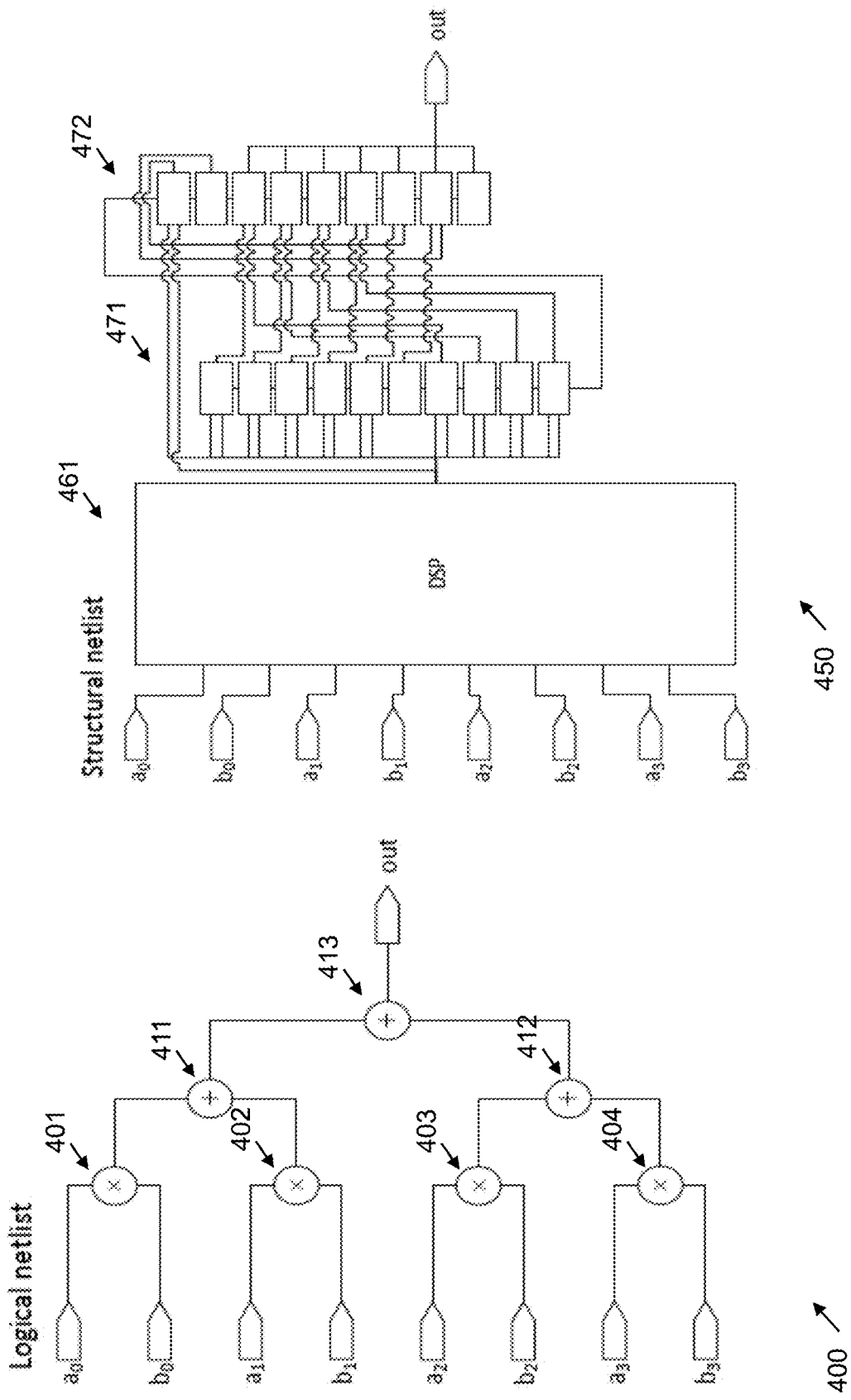

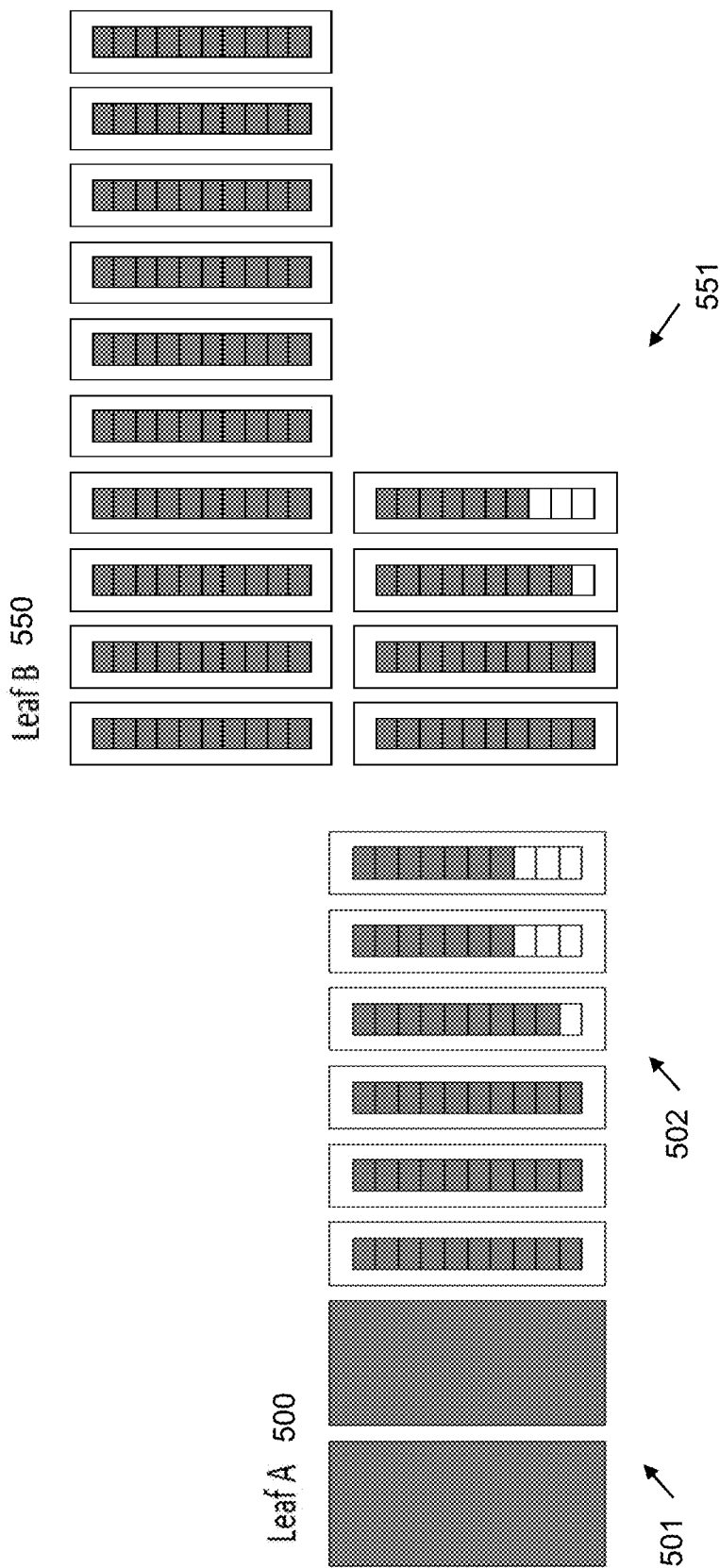

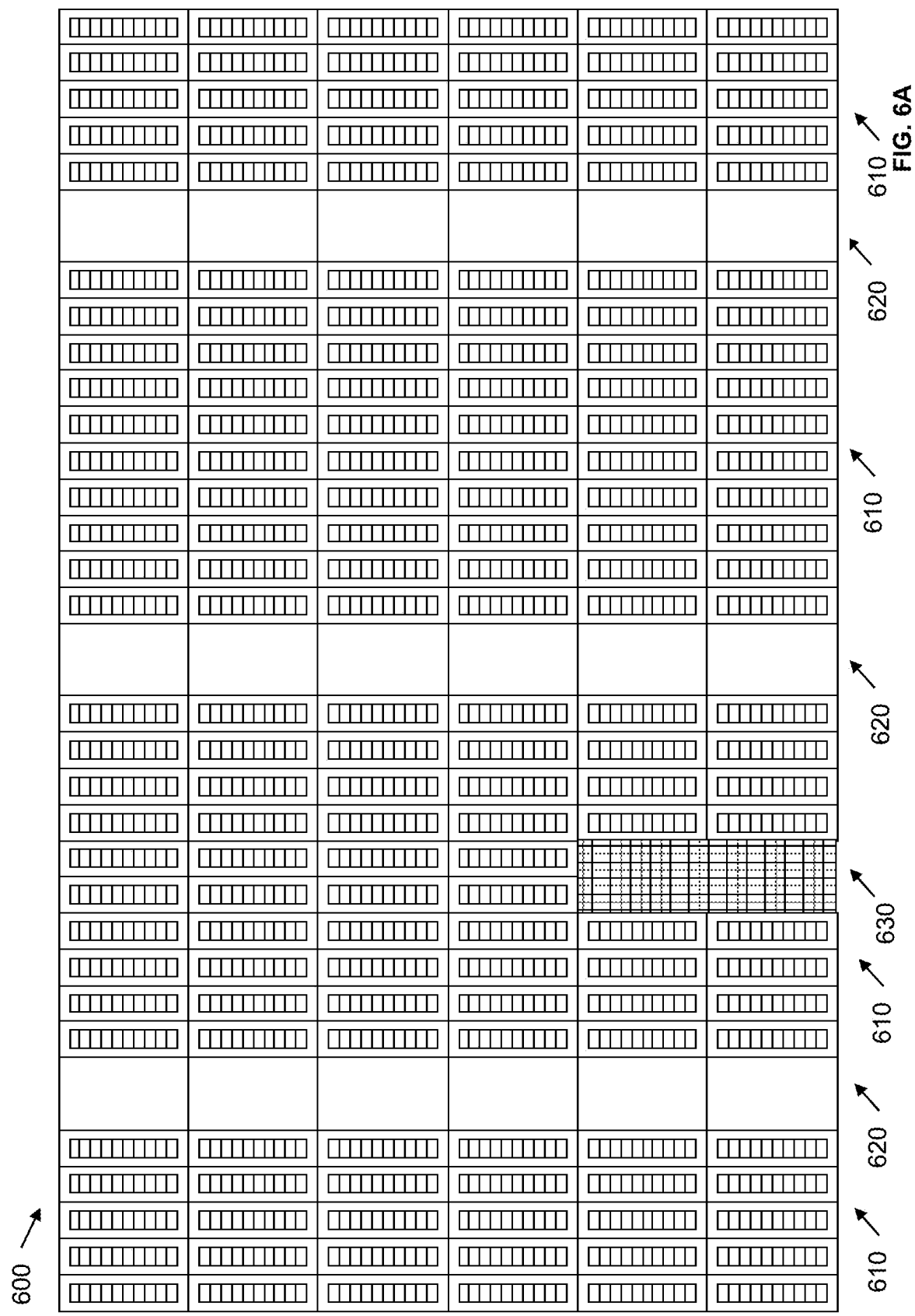

US 11,080,019 B2

METHOD AND APPARATUS FOR PERFORMING SYNTHESIS FOR FIELD PROGRAMMABLE GATE ARRAY EMBEDDED FEATURE PLACEMENT

RELATED APPLICATION

This application claims benefit and priority to Provisional U.S. Patent Application No. 62/616,929 filed on Jan. 12, 2018, entitled "Synthesis for FPGA Embedded Feature Placement", the full and complete subject matter of which is hereby expressly incorporated by reference in its entirety.

FIELD

Embodiments of the present disclosure relate to tools for designing systems on target devices. More specifically, embodiments of the present disclosure relate to a method and apparatus for performing synthesis for field programmable gate array embedded feature placement.

BACKGROUND

Target devices such as field programmable gate arrays (FPGAs), application specific integrated circuits (ASICs), and structured ASICs are used to implement large systems that may include millions of gates and megabits of embedded memory. The complexity of a large system often requires the use of electronic design automation (EDA) tools to create and optimize a design for the system onto physical target devices. Among the procedures performed by EDA tools in a computer aided design (CAD) compilation flow is hardware description language (HDL) compilation. HDL compilation involves performing synthesis, placement, routing, and timing analysis of the system on the target device.

As the demand for large computation accelerators for systems increases for various applications, the need arises for target devices to efficiently pack components used for implementing the large computation accelerators such that a large percentage of the logic on the target device is utilized. Current EDA tools encounter the challenge of efficiently packing components that perform optimally on a target device within a reasonable amount of design compilation time.

BRIEF DESCRIPTION OF THE DRAWINGS

The features and advantages of embodiments of the present disclosure are illustrated by way of example and are not intended to limit the scope of the embodiments of the present disclosure to the particular embodiments shown.

FIG. 4A illustrates a logical netlist of a leaf according to an exemplary embodiment of the present disclosure.

FIG. 4B illustrates a structural netlist of a leaf according to an exemplary embodiment of the present disclosure.

FIG. 5A illustrates a representation of resources required to implement a first variation of a leaf according to an exemplary embodiment of the present disclosure.

FIG. 5B illustrates a representation of resources required to implement a second variation of a leaf according to an exemplary embodiment of the present disclosure.

FIG. 6A illustrates a portion of a target device with programmable resources according to an embodiment of the present disclosure.

DETAILED DESCRIPTION

In the following description, for purposes of explanation, specific nomenclature is set forth to provide a thorough understanding of embodiments of the present disclosure. It will be apparent to one skilled in the art that specific details in the description may not be required to practice the embodiments of the present disclosure. In other instances, well-known circuits, devices, procedures, and programs are shown in block diagram form to avoid obscuring embodiments of the present disclosure unnecessarily.

Traditional procedures for designing a system on a target device, such as those used by field programmable gate array computer aided design tools, typically approach place and route problems as a flat search. By default the flat search spreads the design to use available resources without having an expectation of future development. This approach is fundamentally problematic when dealing with large regular arrays. The arrays are considered "regular" or "repeating" in that they are functionally equivalent and that occur frequently in a design. In addition, an extended compilation runtime required for placement of the large regular arrays is undesirable.

Figure 1:
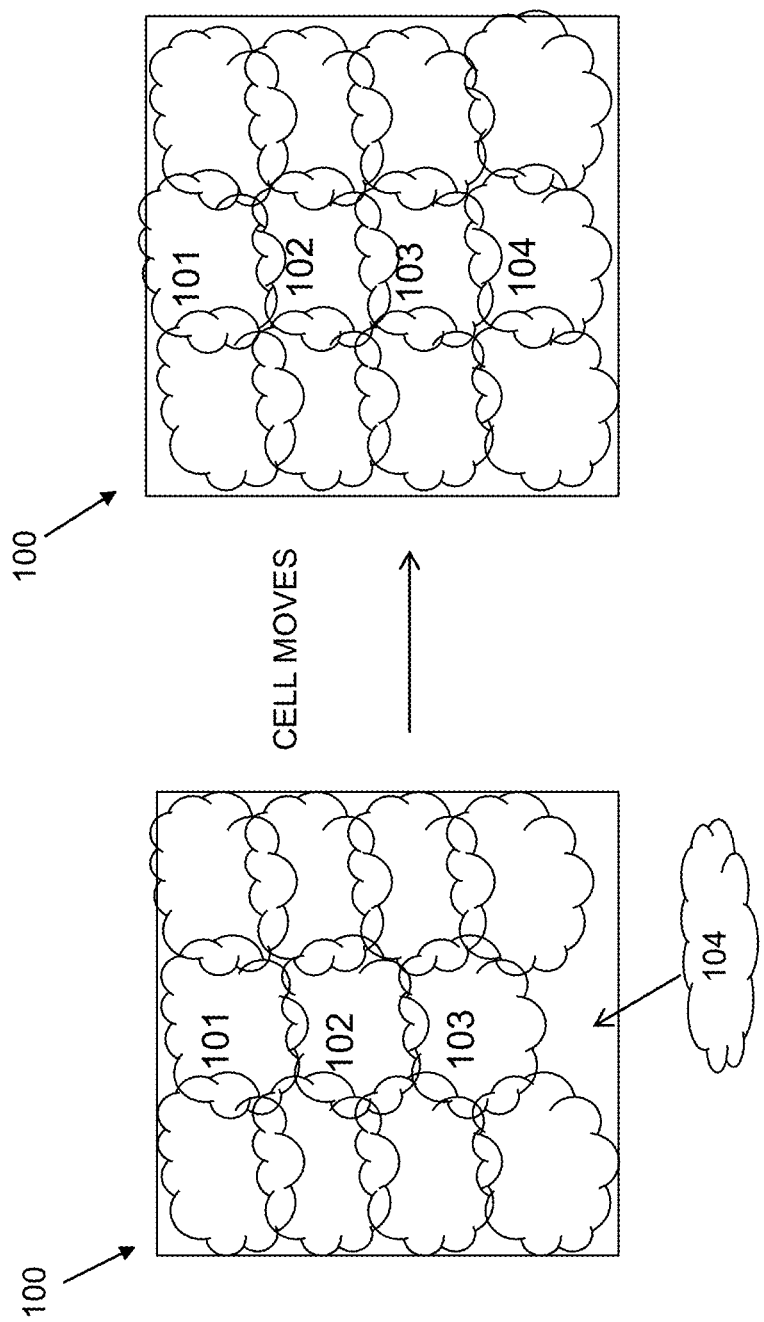
FIG. 1 illustrates results from implementing a traditional placement procedure.

FIG. 1 illustrates a placement example using a traditional placement procedure. In this example, the traditional placement procedure attempts to arrange 12 sections of circuitry on a target device such as a field programmable gate array 100. The 12 sections of circuitry share a same functionality and share a same (repeating) structure. As shown on the left, the traditional placement procedure places 11 of the 12 sections, but due to spreading of the 11 sections, there is insufficient space to place the last section 104. The traditional placement procedure may distort the aspect ratio of section 104 to fit it in the field programmable gate array 100. However, distorting the aspect ratio results in circuit speed degradation, which is undesirable. Alternatively, as shown on the right of FIG. 1, the traditional placement procedure re-adjusts the sections 101-103 upward to create room for section 104. The re-adjustment, however, results in additional compilation runtime, which is also undesirable. The traditional placement procedure fails to take advantage of the regular, repeating structure of the sections of circuitry and re-use partial placement results which could improve placement and reduce compilation time.

Figure 2:
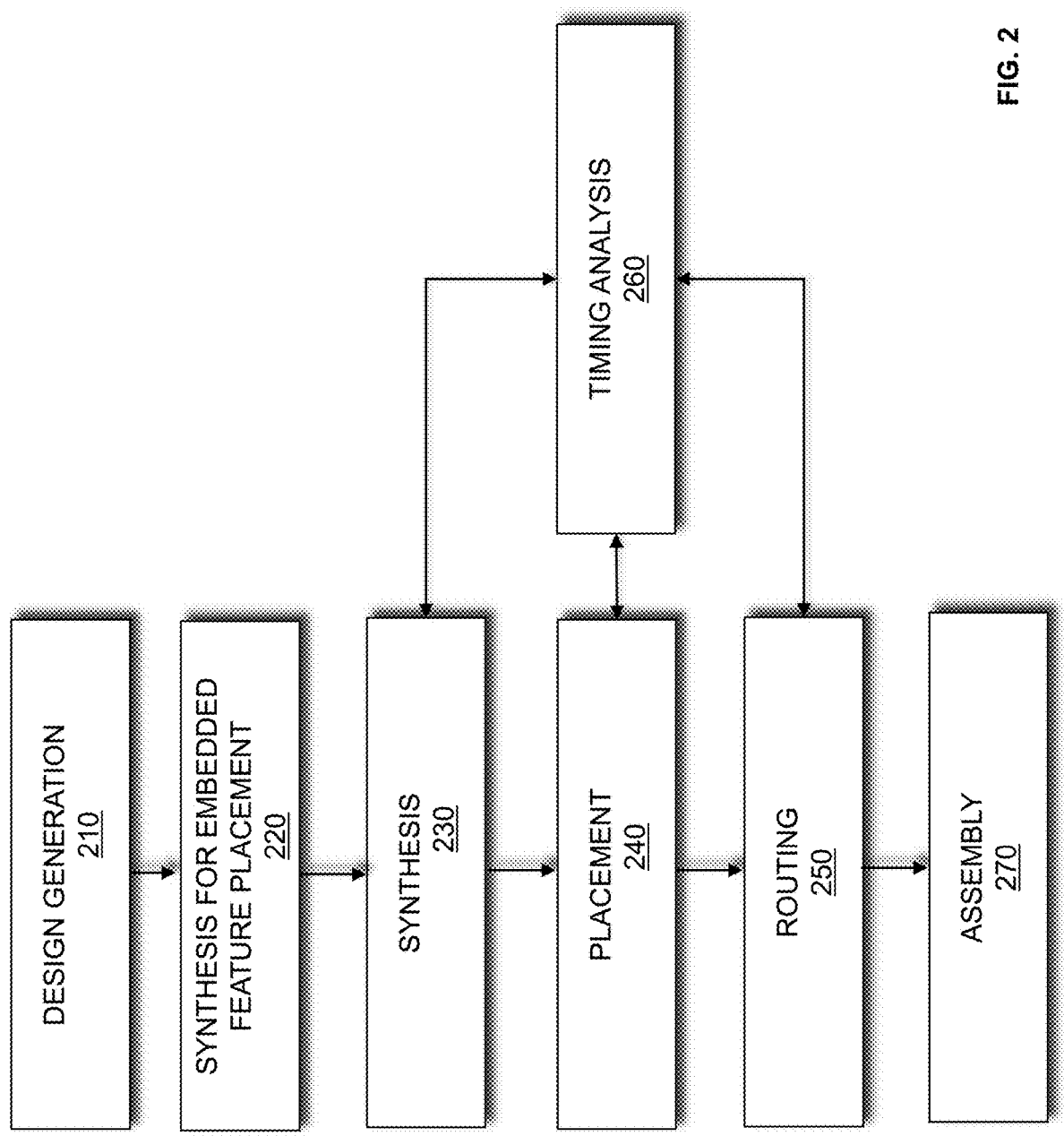
FIG. 2 is a flow chart illustrating a method for designing a system on a target device according to an exemplary embodiment of the present disclosure.

FIG. 2 is a flow chart illustrating a method for designing a system on a target device according to an exemplary embodiment of the present disclosure. The procedures described in FIG. 2 may collectively be referred to as "compilation" of a design. The target device may be a field programmable gate array (FPGA), application specific integrated circuit (ASIC), a structured ASIC, or other device whose functionality may be described by a hardware description language (HDL). At 210, a design for the system is generated. According to an embodiment of the present disclosure, the design is generated in response to input provided by a user. In this embodiment, the user may input a register-transfer-level (RTL) description of the system, select and connect logic from a design library, or utilize other design input options. Alternatively, the input provided by the user may be a computer language description of the system. In this embodiment, a high-level compilation of the computer language description of the system is performed. The design for the system generated may be in HDL.

At 220, synthesis for FPGA embedded feature placement is performed. According to an embodiment of the present disclosure, synthesis for FPGA embedded feature placement identifies structures in a design that are repeated throughout the design. The structures may be used to implement logic functions, multipliers, memory arrays, processors or other components. Synthesis for FPGA embedded feature placement synthesizes and places one of the identified structures in a densely packed manner to create a "leaf". Variations of the synthesized and placed structure may also be generated to create variations of the leaf. A layout of the leaves is generated for the system. By leveraging the synthesis and placement results, the layout of the leaves may be generated efficiently in a timely manner. It should be appreciated that after a layout of the leaves for a first repeating structure is generated, a layout of the leaves for a second repeating structure may similarly be generated. A structural netlist for the synthesized and placed repeated structure(s) is generated. It should be appreciated that synthesis for FPGA embedded feature placement 220 may be performed prior to synthesis 230 and placement 240, or alternatively together with and during synthesis 230 and placement 240.

At 230, other structures in the system which were not identified for synthesis for FPGA embedded feature placement are synthesized and a netlist is generated. According to an embodiment of the present disclosure, the other structures in the system are synthesized while respecting constraints associated with the structural netlist generated for the identified structures at 220. Synthesis includes generating a logic design of the system to be implemented by the target device. According to an embodiment of the present disclosure, synthesis generates an optimized logical representation of the system from an HDL design definition. Synthesis also includes mapping the optimized logic design (technology mapping). Mapping includes determining how to implement logic gates and logic elements in the optimized logic representation with specific resources on the target device such as logic elements and functional blocks. According to an embodiment of the present disclosure, a netlist is generated from mapping. This netlist may be an optimized technology-mapped netlist generated from the HDL.

At 240, the other structures in the system which were not identified for synthesis for FPGA embedded feature placement synthesis are placed. According to an embodiment of the present disclosure, the other structures in the system are placed while respecting constraints associated with the structural netlist generated for the identified structures at 220. According to an embodiment of the present disclosure, placement involves placing the mapped logical system design on the target device. Placement works on the technology-mapped netlist to produce a placement for each of the logic elements and functional blocks. According to an embodiment of the present disclosure, placement includes fitting the system on the target device by determining which resources on the target device are to be used to implement the logic elements and functional blocks identified during synthesis. Placement may include clustering which involves grouping logic elements together to form the logic clusters present on the target device. According to an embodiment of the present disclosure, clustering is performed at an early stage of placement and occurs after synthesis during the placement preparation stage. Placement may also minimize the distance between interconnected resources to meet timing constraints of the timing netlist.

At 250, the placed design is routed. During routing, routing resources on the target device are allocated to provide interconnections between logic gates, logic elements, and other components on the target device. According to an embodiment of the present disclosure, routing aims to reduce the amount of wiring used to connect components in the placed logic design. Routability may include performing fanout splitting, logic duplication, logical rewiring, or other procedures. It should be appreciated that one or more of the procedures may be performed on the placed logic design. Timing optimization may also be performed during routing to allocate routing resources to meet the timing constraints of the timing netlist.

At 260, timing analysis is performed on the system designed. According to an embodiment of the present disclosure, the timing analysis determines whether timing constraints of the system are satisfied. As part of timing analysis, slack analysis may be performed. It should be appreciated that the timing analysis may be performed during and/or after each of the synthesis 230, placement 240, and routing procedures 250 to guide compiler optimizations.

At 270, an assembly procedure is performed. The assembly procedure involves creating a program file that includes information determined by the procedures described at 210, 220, 230, 240, 250, and 260. The program file (configuration file) may be a configuration bit stream that may be used to program (configure) a target device. In the case of an ASIC, the program file may represent the physical layout of the circuit. According to an embodiment of the present disclosure, the procedures illustrated in FIG. 1 may be performed by an EDA tool executed on a first computer system. The program file generated may be transmitted to a second computer system to allow the design of the system to be further processed. The program file may be transmitted from either the first or second computer system onto the target device and used to program the target device according to the system design. It should be appreciated that the design of the system may also be output in other forms such as on a display device or other medium. The target device may be programmed with the program file. By programming the target with the program file, components (programmable resources) on the target device are physically transformed to implement the system.

According to an embodiment of the present disclosure, when the target device is an FPGA, the programmable resources may include components such as programmable logic blocks, and digital signal processor blocks that may be used to implement logic functions. The programmable resources may also include programmable routing that connects the logic functions. The program file with configuration bitstream may be used to configure an FPGA using various programming technologies. For instance, the FPGA may utilize static random access memory (SRAM), flash, or antifuse-based programming technology to program the programmable resources. The SRAM-based programming technology uses static memory cells which are divided throughout the FPGA to configure routing interconnect which are steered by small multiplexers, and to configure logic blocks to implement logic functions. Similarly, flash-based programming technology uses floating-gate transistors in flash memory for configuration storage. Antifuse-based programming technology requires burning of antifuses to program resources. The antifuse-based programming technology allows for programming only once and FPGAs utilizing antifuse-based programming cannot be reprogrammed.

Figure 3:
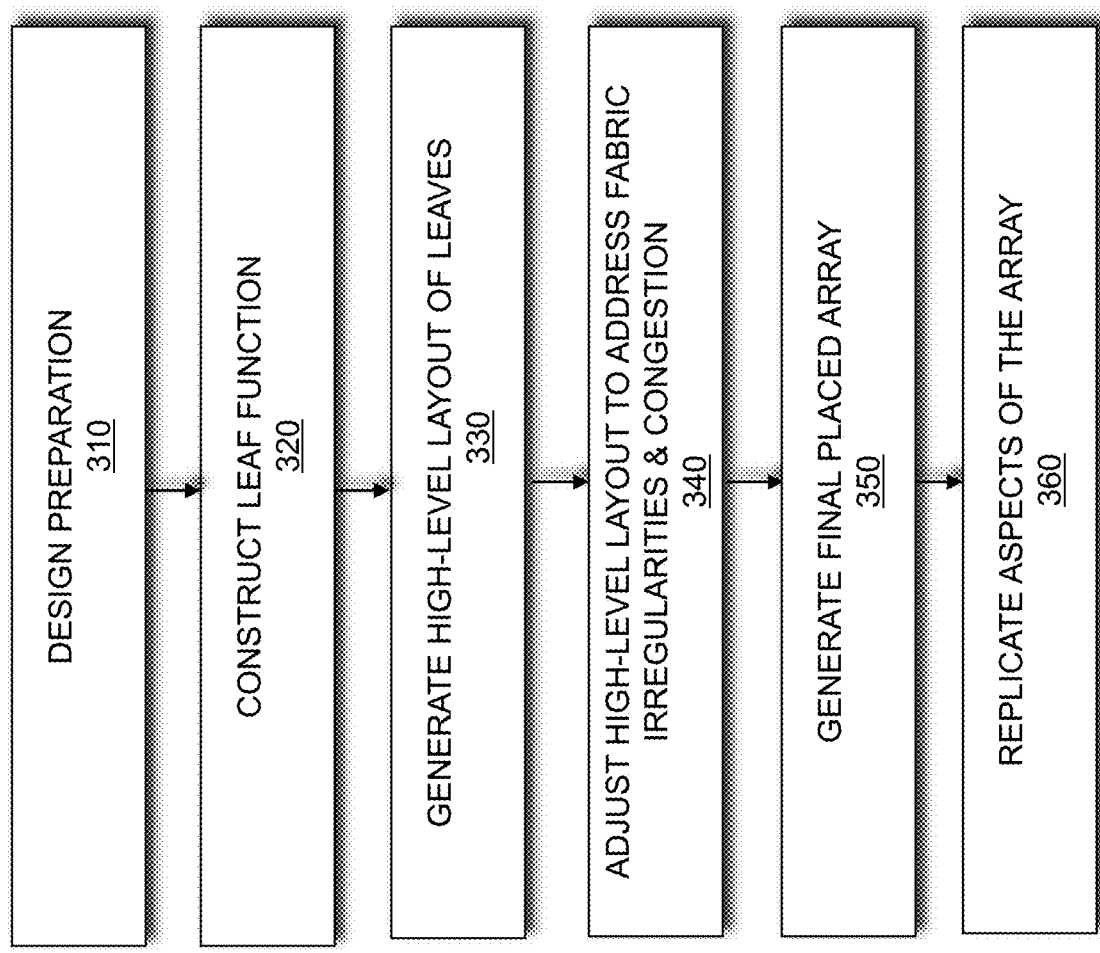
FIG. 3 is a flow chart illustrating a method for performing synthesis for FPGA embedded feature placement according to an exemplary embodiment of the present disclosure.

FIG. 3 is a flow chart illustrating a method for performing synthesis for FPGA embedded feature placement according to an exemplary embodiment of the present disclosure. The procedures illustrated in FIG. 3 may be utilized to implement procedure 220 of FIG. 2. At 310, design preparation is performed. According to an embodiment of the present disclosure, design preparation may include performing one or more of elaboration, flattening, and optimizing the design. Design elaboration reads in a RTL description of the design which includes a hierarchical design description and creates a netlist for every design module where a node in the netlist may represent instances of other modules. Flattening may also be performed on the netlist where every module instance in the netlist is replaced by a sub-netlist from a corresponding module. Following flattening, optimizations may be performed on the flattened design. According to an embodiment of the present disclosure, optimizations performed on the flattened netlist may include simplifying an implementation of a subnetlist based on constants or redundancies injected from a higher level. For example, a sub-netlist may receive constant inputs from a parent specifying a mode of operation. Optimizations may also include merging functionally identical nodes which appear in more than one subnetlist.

At 320, a leaf function of interest is constructed. The leaf function is represented as a structural netlist. The leaf function may include memory blocks, logic cells, logic array blocks, and DSP blocks. According to an embodiment of the present disclosure, a portion of a system that is implemented greater than a predetermined number of times is identified and determined to be the leaf function. Considerations for the portion identified may include well-defined boundaries. The considerations may include whether the portion includes complex internal behavior where signal activities inside the portion exceed a first predetermined threshold. The considerations may include whether the portion includes simple external behavior where signal activities crossing boundaries of the portion do not exceed a second predetermined threshold. According to an embodiment of the present disclosure, the leaf assembly is designed to make dense, efficient utilization of resources on a target device of greater than 90%.

FIG. 4A illustrates a logical netlist of a leaf according to an exemplary embodiment of the present disclosure. The logical netlist of the leaf may be identified during procedure 320 of FIG. 3 using the output of the design preparation procedure 310 of FIG. 3. As shown, the leaf is a DOT product unit 400 with multi-bit inputs a0-a3 and b0-b3. The DOT product unit 400 includes a plurality of multipliers 401-404. In one embodiment, the multipliers may be embedded hard logic, e.g. DSP Blocks. In another embodiment, multipliers 401-404 may be constructed from soft logic, which in turn may each comprise a leaf. The multiplier products are summed by logical adders 411-413 that form an adder tree. The logical netlist of DOT product unit 400 is an example of a portion of a system that is identified to be implemented greater than a predetermined number of times.

FIG. 4B illustrates a structural netlist of the leaf illustrated in FIG. 4A according to an exemplary embodiment of the present disclosure. The structural netlist of the leaf may be generated during procedure 320 of FIG. 3 after the logical netlist of the leaf is identified. The structural netlist identifies specific resources on a target device used to implement the leaf. As shown, the multiplier unit 450 utilizes a DSP block 461 and a plurality of logic cells in logic array blocks 471 and 472 to implement the partial product logic 401-404 and logical adders 411-413 from the logical netlist.

Referring back to 320, when constructing a leaf function, it should be appreciated that more than one arrangement of specific resources on a target device may be identified for implementing a leaf. In such situations, a plurality of structural netlists may be generated to describe variations on how to construct a leaf where the variations are functionally equivalent. The variations may differ in the types of resources and/or a percentage of the types of resources used. For example, a first variation of a leaf may utilize only logic array blocks, where a second variation of the leaf utilizes a first combination of logic array blocks and digital signal processing blocks, and a third variation of the leaf utilizes a second combination of logic array blocks and digital signal processing blocks. Generating different variations of a leaf provides additional placement options for the system.

FIG. 5A illustrates a representation of resources required to implement a first variation of a leaf (Leaf A 500) according to an exemplary embodiment of the present disclosure. As shown, Leaf A 500 is constructed utilizing 2 DSP blocks 501, 3 full LABs, and 3 partially full LABs. FIG. 5B illustrates a representation of resources required to implement a second variation of a leaf (Leaf B 550) according to an exemplary embodiment of the present disclosure. As shown, leaf B 550 is constructed utilizing 12 full LABs, and 2 partially full LABs, and no DSP blocks.

Referring back to FIG. 3, at 330 a high-level layout of leaves is generated. The high-level layout assigns general locations on a target device to the leave and determines which variation of a leaf to implement at locations on the target device. According to an embodiment of the present disclosure, each of the design variations of the leaf is used in the high-level layout of leaves. The high-level layout includes an array of x and y coordinates for the leaves. According to an embodiment of the present disclosure, the high-level layout is generated with consideration of desired flow of data in and out of the system. If a leaf requires a physical resource that is limited in number, spreading may be required.

Figure 6B:
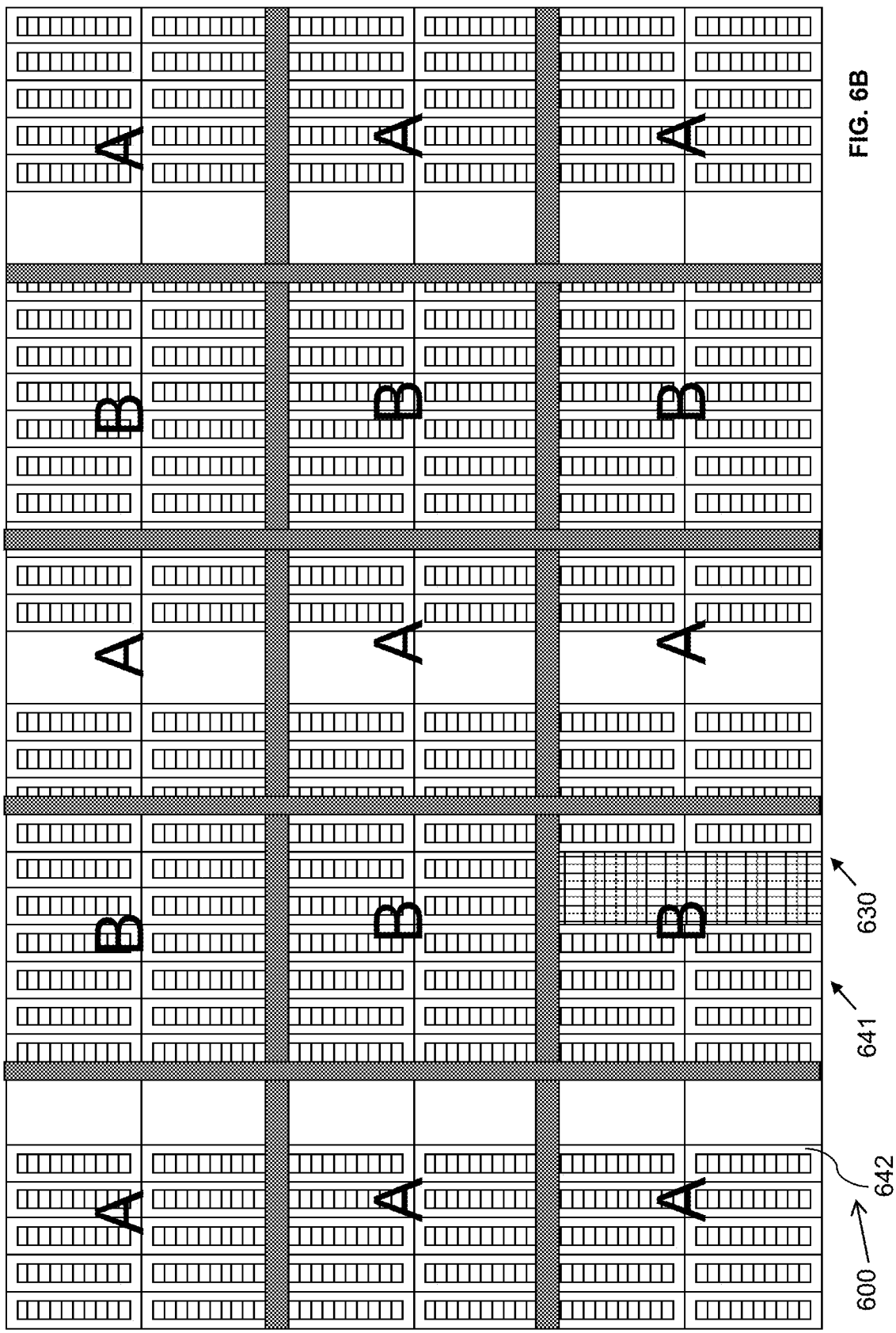
FIG. 6B illustrates a high-level layout of leaves on a portion of a target device with programmable resources according to an embodiment of the present disclosure.

FIG. 6A illustrates a portion of a target device 600 with programmable resources according to an embodiment of the present disclosure. The programmable resources include logic array blocks 610, and DSP blocks 620. The target device 600 also includes an area 630 which includes fabric irregularities and is not programmable to implement any function. Other types of programmable resources are available on the target device 600, but are not illustrated in FIG. 6A. FIG. 6B illustrates a high-level layout of leaves on a portion of a target device with programmable resources according to an exemplary embodiment of the present disclosure. As shown, the target device is divided into a plurality of areas that are assigned for implementing leaves. In this example, the target device 600 is divided into a plurality of areas that are assigned for implementing Leaf A 500 and Leaf B 550 (shown in FIGS. 5A and 5B).

Referring back to FIG. 3, at 340, the high-level layout of leaves is adjusted. The adjustments may be made to address irregularities of the target device. For example, if an assigned position of a leaf falls on a component or an area, such as area 730, that is incapable of implementing the leaf or is unavailable, a legal position is found for the leaf. The adjustments may also be made to reduce congestion in the leaf and/or in the system. In one embodiment, a congestion metric is calculated that accounts for a number of inputs and outputs to an embedded block, a total area of a leaf, a hamming weight, and a Manhattan distance of the leaf. Adjustments may be made to the high-level layout of leaves in response to the congestion metric.

Figure 7:
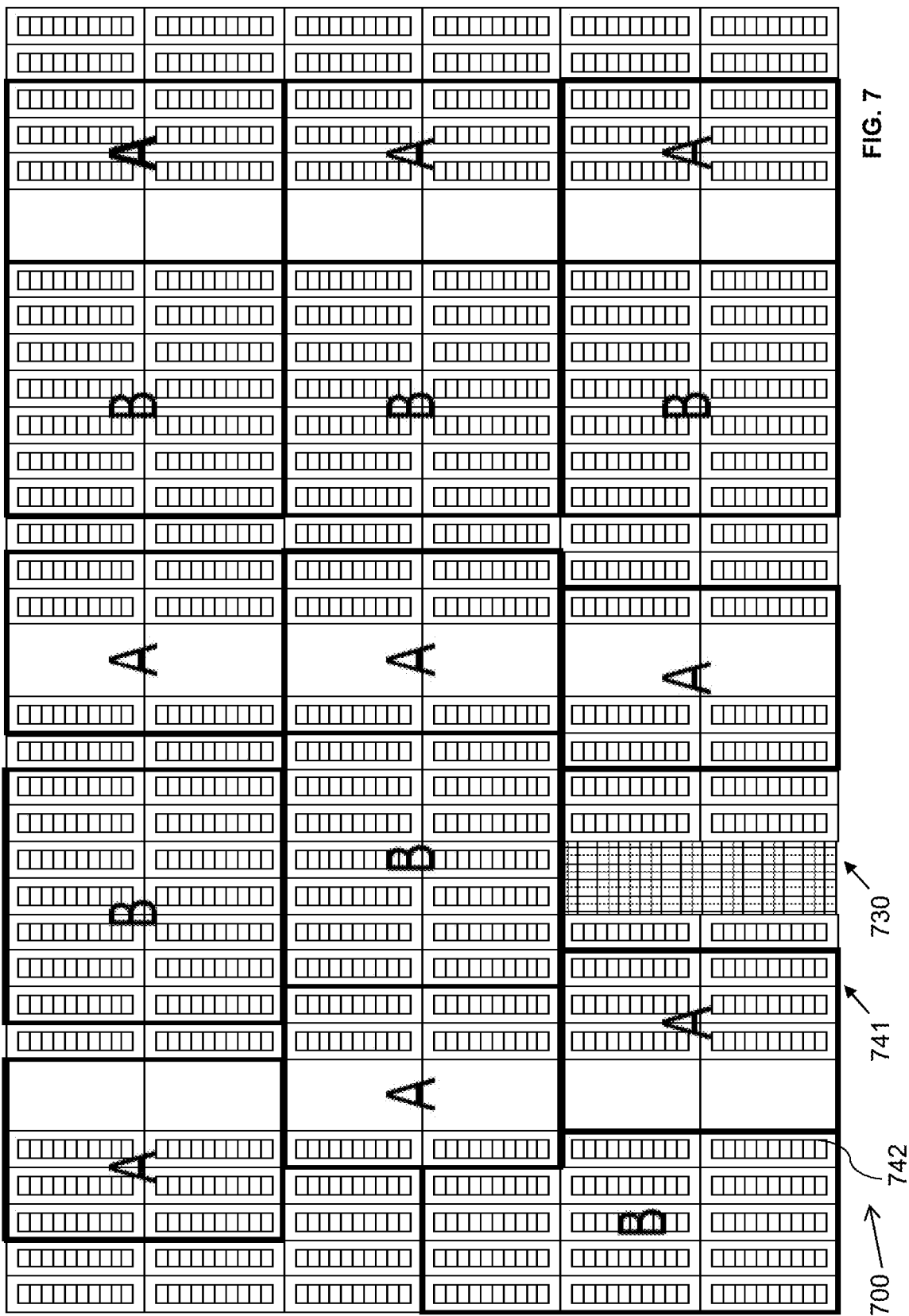
FIG. 7 illustrates a legalized layout of leaves on a portion of a target device according to an embodiment of the present disclosure.

FIG. 7 illustrates a legalized layout of leaves on a portion of a target device 700 according to an embodiment of the present disclosure. The legalized layout of leaves illustrated in FIG. 7 may be generated by procedure 340 (shown in FIG. 3). As illustrated in FIG. 7, the high-level layout illustrated in FIG. 6B is further refined to indicate which LAB blocks are to be associated with a specific Leaf A and Leaf B. For example, in FIG. 6B, grid section 641 is associated with implementing Leaf B, and grid section 642 is associated with implementing Leaf A. However, due to the irregularities in area 630, Leaf B cannot be implemented in grid section 641. In the legalized layout of leaves illustrated in FIG. 7, section 741 is associated with implementing Leaf A, and section 742 is associated with implementing Leaf B.

Referring back to FIG. 3, at 350 a final placed array is generated. An RTL structural netlist for the leaf generated from 320 is assembled into a larger structural netlist expressing the functionality of the desired array generated from 330. According to an embodiment of the present disclosure, the aggregation is achieved by generating a loop and appropriate connections of shared and unique input ports. The adjusted and legalized high-level layout generated at 340 is utilized to obtain location information. The leaf location plan is iterated and repeated at each location coordinate. Changes may be made to node names as required by a newly constructed logical netlist.

Figure 8:
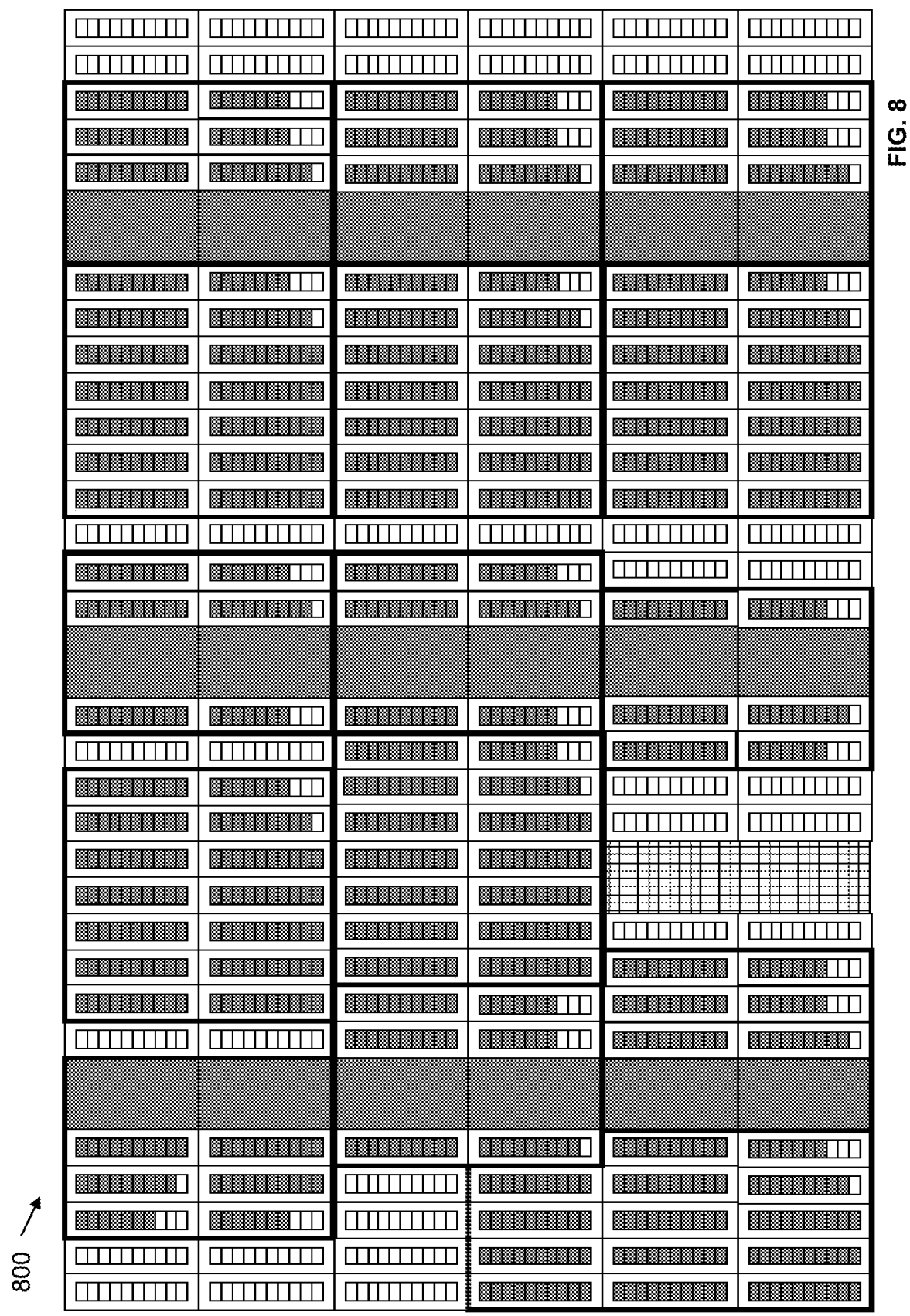
FIG. 8 illustrates a final placement of a layout of leaves on a portion of a target device according to an embodiment of the present disclosure.

FIG. 8 illustrates a final placement of a layout of leaves on a portion of a target device 800 according to an embodiment of the present disclosure. As shown, the specific location coordinates on the target device is assigned for each logic cell, logic array block, and DSP block required to implement the array (as indicated by the shaded components). The final placement of the layout of leaves may be generated by procedure 350 (shown in FIG. 3).

Referring back to FIG. 3, at 360 aspects of the final placed array are replicated. According to an embodiment of the present disclosure, the final placed array may be treated as a leaf and replicated on the target device utilizing procedures 320, 330, 340, and 350.

Figure 9:
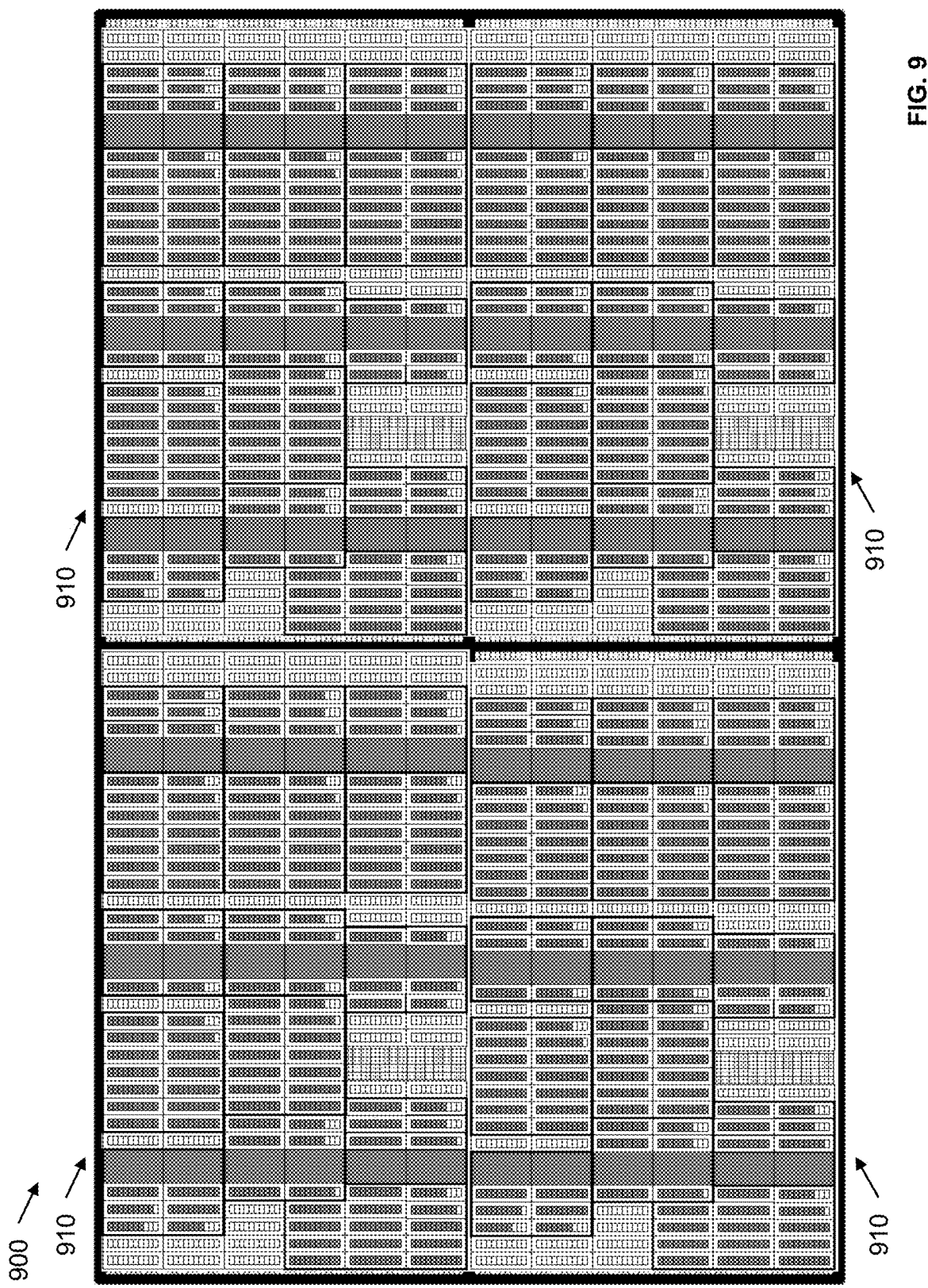
FIG. 9 illustrates a replication of an array of a plurality of leaves according to an exemplary embodiment of the present disclosure.

FIG. 9 illustrates a replication of an array of a plurality of leaves according to an exemplary embodiment of the present disclosure. As shown, a final placement of a layout of leaves 910 is replicated a plurality of times to generate a larger array 900. The final placement of the layout of leaves 910 may be generated in a manner similar to the final placement of the layout of leaves 800. The replication of the array of the plurality of leaves may be generated by procedure 360 (shown in FIG. 3).

FIGS. 2 and 3 are flow charts that illustrate embodiments of the present disclosure. The procedures described in these figures may be performed by an EDA tool implemented by a computer system. Some of the techniques illustrated may be performed sequentially, in parallel or in an order other than that which is described and that the procedures described may be repeated. It is appreciated that not all of the techniques described are required to be performed, that additional techniques may be added, and that some of the illustrated techniques may be substituted with other techniques.

For example, the procedures described in FIG. 3 may be repeated to identify another repeating portion of the system and to generate another structural netlist or modify the previously generated structural netlist to reflect synthesizing and placing of additional leaves. It should be appreciated that although the examples illustrated in FIGS. 5A-9 are directed to performing synthesis for FPGA embedded feature placement to generate an array of leaves that perform a logic function utilizing either logic cells in a LAB or a combination of DSP blocks and logic cells in a LAB, embodiments of the present disclosure may also be used to generate other types of array. For example, the embodiments of the present disclosure may be used to generate an array of leaves that implement a large memory with smaller memory blocks, an array of leaves that implement a soft processor with LABs, DSP blocks, and memory blocks, or other arrays.

Figure 10:
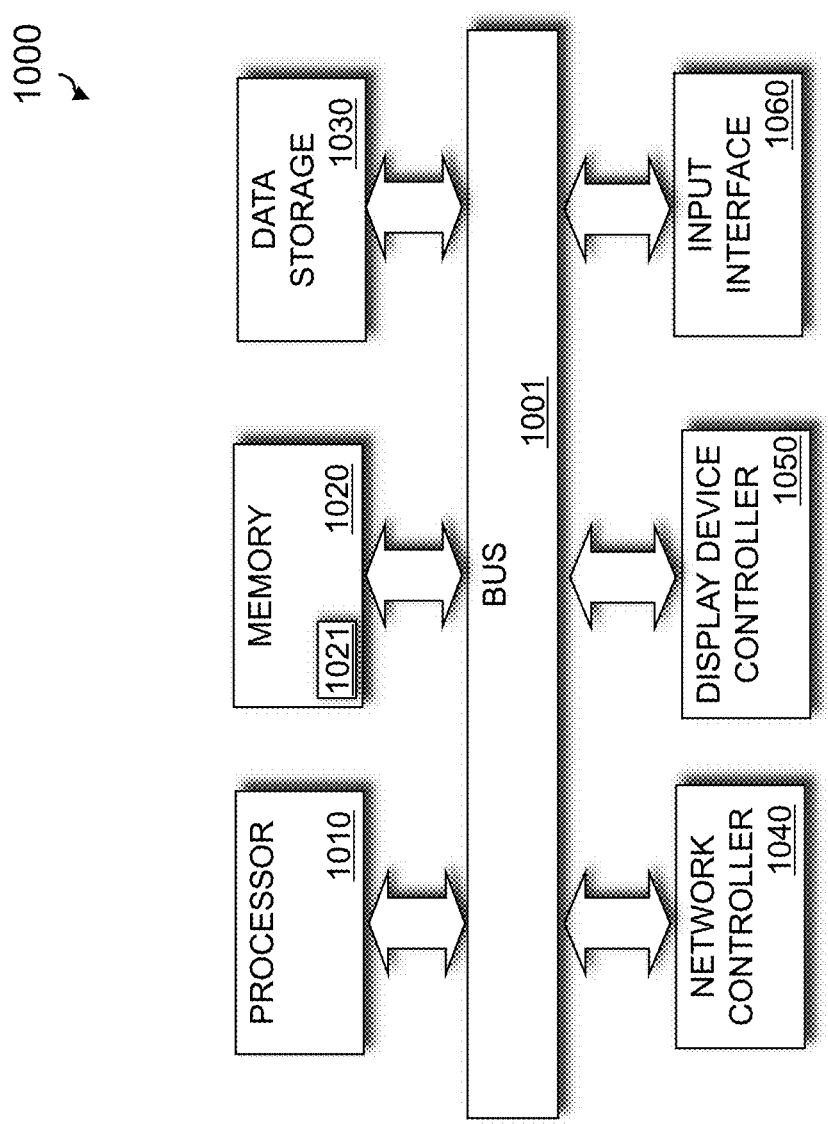
FIG. 10 illustrates a block diagram of a computer system implementing a system designer according to an exemplary embodiment of the present disclosure.

FIG. 10 is a block diagram of an exemplary computer system 1000 in which an example embodiment of the present disclosure resides. The computer system 1000 includes a processor 1010 that process data signals. The processor 1010 is coupled to a bus 1001 or other switch fabric that transmits data signals between processor 1010 and other components in the computer system 1000. The computer system 1000 includes a memory 1020. The memory 1020 may store instructions and code represented by data signals that may be executed by the processor 1010. A data storage device 1030 is also coupled to the bus 1001.

A network controller 1040 is coupled to the bus 1001. The network controller 1040 may link the computer system 1000 to a network of computers (not shown) and supports communication among the machines. A display device controller 1050 is coupled to the bus 1001. The display device controller 1050 allows coupling of a display device (not shown) to the computer system 1000 and acts as an interface between the display device and the computer system 1000. An input interface 1060 is coupled to the bus 1001. The input interface 1060 allows coupling of an input device (not shown) to the computer system 1000 and transmits data signals from the input device to the computer system 1000.

A system designer 1021 may reside in the memory 1020 and be executed by the processor 1010. The system designer 1021 may operate to perform design generation, synthesis for FPGA embedded feature placement, synthesis, placement, routing, timing analysis, and assembly on a design for the system. According to an embodiment of the present disclosure, synthesis for FPGA embedded feature placement identifies structures in a design that are repeated throughout the design. The structures may be used to implement logic functions, multipliers, memory arrays, processors or other components. Synthesis for FPGA embedded feature placement synthesizes and places one of the identified structures in a densely packed manner to create a "leaf". Variations of the synthesized and placed structure may also be generated to create variations of the leaf. A layout of the leaves is generated for the system. By leveraging the synthesis and placement results, the layout of the leaves may be generated efficiently in a timely manner. It should be appreciated that after a layout of the leaves for a first repeating structure is generated, a layout of the leaves for a second repeating structure may similarly be generated. A structural netlist for the synthesized and placed repeated structure(s) is generated.

Figure 11:
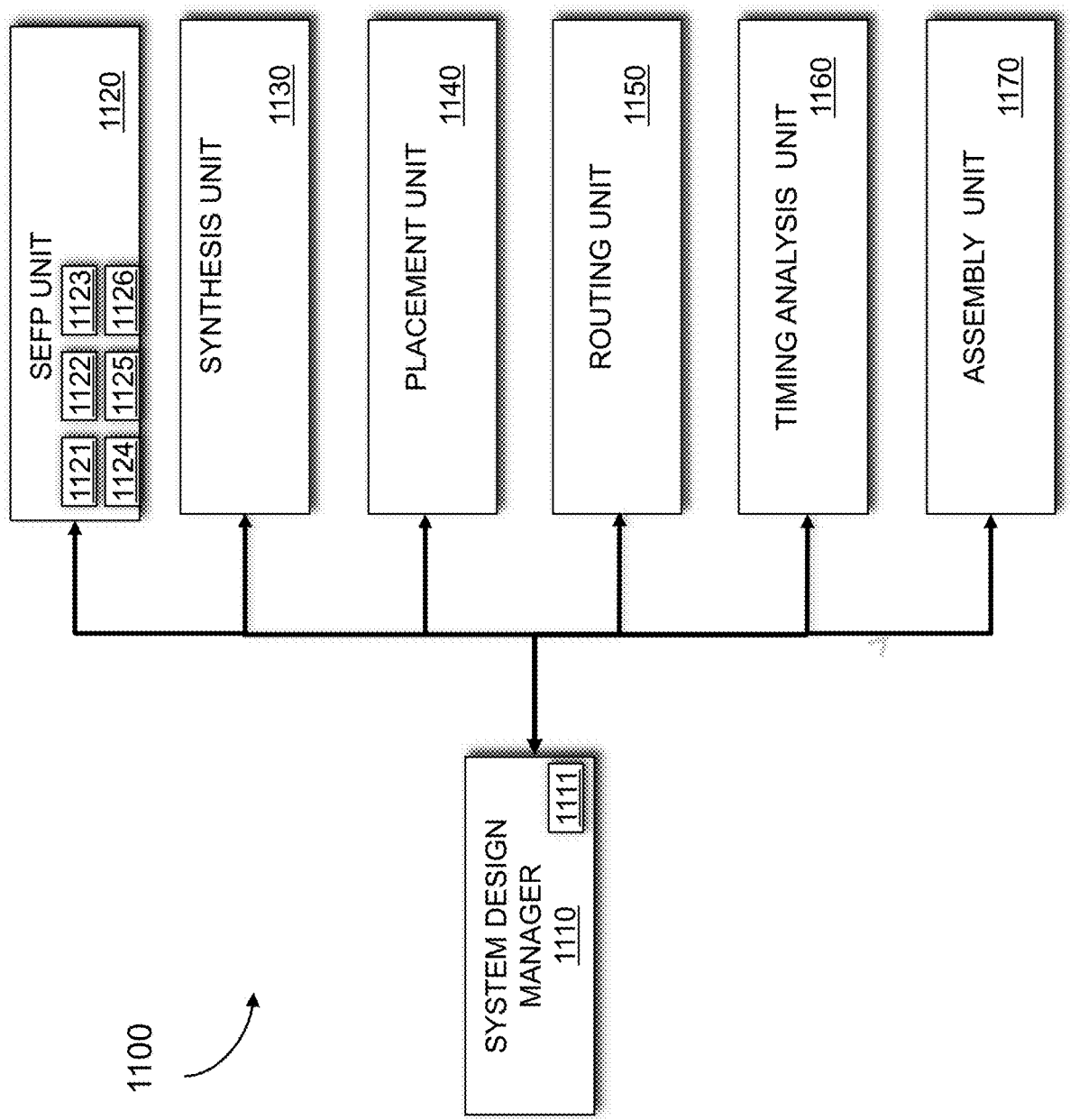
FIG. 11 is a block diagram of a system designer according to an exemplary embodiment of the present disclosure.

FIG. 11 illustrates a system designer 1100 according to an embodiment of the present disclosure. The system designer 1100 may be an EDA tool for designing a system on a target device such as an FPGA, application-specific integrated circuit (ASIC), structured ASIC, or other circuitry. FIG. 11 illustrates modules implementing an embodiment of the system designer 1100. According to one embodiment, the modules represent software modules and system design may be performed by a computer system such as the one illustrated in FIG. 10 executing sequences of instructions represented by the modules shown in FIG. 11. It should be appreciated that the system design may also be performed by more than on computer systems where the modules are implemented in the more than one computer systems. Execution of the sequences of instructions causes the computer system to support system design as will be described hereafter. In alternate embodiments, hard-wire circuitry may be used in place of or in combination with software instructions to implement embodiments of present disclosure. Thus, embodiments of present disclosure are not limited to any specific combination of hardware circuitry and software. The system designer 1100 includes a system designer manager 1110. The system designer manager 1110 is connected to and transmits data between the components of the system designer 1100. The system design manager 1110 includes a design generation unit 1111. According to an embodiment of the present disclosure, the design generation unit 1111 generates a design in response to input provided by a user. In this embodiment, the user may input a register-transfer-level (RTL) description of the system, select and connect logic from a design library, or utilize other design input options. Alternatively, the input provided by the user may be a computer language description of the system. In this embodiment, a high-level compilation of the computer language description of the system is performed. The design for the system generated may be in HDL.

The system designer 1100 includes a Synthesis for embedded feature placement (SEFP) unit 1120. The SEFP unit 1120 includes a design preparation unit 1121. According to an embodiment of the present disclosure, the design preparation unit may perform one or more of elaboration, flattening, and optimizing the design. Design elaboration reads in a RTL description of the design which includes a hierarchical design description and creates a netlist for every design module where a node in the netlist may represent instances of other modules. Flattening may also be performed on the netlist where every module instance in the netlist is replaced by a sub-netlist from a corresponding module. Following flattening optimizations may be performed on the flattened design.

The SEFP unit 1120 includes a leaf function construction unit 1122. The leaf function may be represented as a structural netlist. The leaf function may include memory blocks, logic cells, logic array blocks, and DSP blocks. According to an embodiment of the present disclosure, a portion of a system that is implemented greater than a predetermined number of times is identified and determined to be the leaf function. Considerations for the portion identified may include well-defined boundaries. The considerations may include whether the portion includes complex internal behavior where signal activities inside the portion exceed a first predetermined threshold. The considerations may include whether the portion includes simple external behavior where signal activities crossing boundaries of the portion do not exceed a second predetermined threshold. According to an embodiment of the present disclosure, the leaf assembly is designed to make dense, efficient utilization of resources on a target device of greater than 90%.

When constructing a leaf function, it should be appreciated that more than one arrangement of specific resources on a target device may be identified for implementing a leaf. In such situations, a plurality of structural netlists may be generated to describe variations on how to construct a leaf where the variations are functionally equivalent. The variations may differ in the types of resources and/or a percentage of the types of resources used. For example, a first variation of a leaf may utilize only logic array blocks, where a second variation of the leaf utilizes a first combination of logic array blocks and digital signal processing blocks, and a third variation of the leaf utilizes a second combination of logic array blocks and digital signal processing blocks. Generating different variations of a leaf provides additional placement options for the system.

The SEFP unit 1120 includes a high-level layout unit 1123 that generates a high-level layout of leaves. The high-level layout assigns general locations on a target device to the leave and determines which variation of a leaf to implement at locations on the target device. According to an embodiment of the present disclosure, each of the design variations of the leaf is used in the high-level layout of leaves. The high-level layout includes an array of x and y coordinates for the leaves. According to an embodiment of the present disclosure, the high-level layout is generated with consideration of desired flow of data in and out of the system. If a leaf requires a physical resource that is limited in number, spreading may be required.

The SEFP unit 1120 includes a high-level layout adjustment unit 1124 that adjusts the high-level layout. The adjustments may be made to address irregularities of the target device. For example, if an assigned position of a leaf falls on a component that is incapable of implementing the leaf or is unavailable, a legal position is found for the leaf. The adjustments may also be made to reduce congestion in the leaf and/or in the system. In one embodiment, a congestion metric is calculated that accounts for a number of inputs and outputs to an embedded block, a total area of a leaf, a hamming weight, and a Manhattan distance of the leaf. Adjustments may be made to the high-level layout of leaves in response to the congestion metric.

The SEFP unit 1120 includes a placed array unit 1125 that generates a final placed array. The placed array unit 1125 assembles a large structural netlist expressing the functionality of the desired array generated by the high-level layout unit 1123 from the RTL structural netlist for the leaf generated by the leaf construction unit 1122.

The SEFP unit 1120 includes an array replication unit 1126 that replicates aspects of the final placed array. According to an embodiment of the present disclosure, the final placed array may be treated as a leaf and replicated on the target device utilizing procedures 320, 330, 340, and 350 (shown in FIG. 3).

The system designer 1100 includes a synthesis unit 1120. Other structures in the system which were not identified for synthesis for FPGA embedded feature placement are synthesized and a netlist is generated. According to an embodiment of the present disclosure, the other structures in the system are synthesized while respecting constraints associated with the structural netlist generated for the identified structures by the SEFP unit 1110. The synthesis unit 1120 takes a conceptual HDL design definition and generates an optimized logical representation of the system. The optimized logical representation of the system generated by the synthesis unit 1120 may include a representation that has a reduced number of functional blocks and registers, such as logic gates and logic elements, required for the system. Alternatively, the optimized logical representation of the system generated by the synthesis unit 1120 may include a representation that has a reduced depth of logic and that generates a lower signal propagation delay.

The synthesis unit 1120 also performs technology mapping. Technology mapping involves determining how to implement the functional blocks and registers in the optimized logic representation utilizing specific resources such as cells on a target device thus creating an optimized "technology-mapped" netlist. The technology-mapped netlist illustrates how the resources (cells) on the target device are utilized to implement the system. In an embodiment where the target device is an FPGA, the technology-mapped netlist may include cells such as logic array blocks (LABs), registers, memory blocks, digital signal processing (DSP) blocks, input output (TO) elements or other components.

The system designer 1100 includes a placement unit 1130. According to an embodiment of the present disclosure, the other structures in the system which were not identified for synthesis for FPGA embedded feature placement are placed by the placement unit 1130. According to an embodiment of the present disclosure, the other structures in the system are placed while respecting constraints associated with the structural netlist generated for the identified structures by the SEFP unit 1110. The placement unit 1130 processes the optimized technology-mapped netlist to produce a placement for each of the functional blocks. The placement identifies which components or areas on the target device are to be used for specific functional blocks and registers.

The system designer 1100 includes a routing unit 1140 that determines the routing resources on the target device to use to provide interconnection between the components implementing functional blocks and registers of the logic design.

The system designer 1100 includes a timing analysis unit 1150 that performs timing analysis to determine whether timing constraints of the system are satisfied.

The system designer 1110 includes an assembly unit 1170. The assembly unit 1170 may perform an assembly procedure that creates a program file that includes the design of the system. The program file (configuration file) may be a configuration bit stream that may be used to program (configure) a target device. In the case of an ASIC, the program file may represent the physical layout of the circuit. According to an embodiment of the present disclosure, the system designer 1100 may be implemented by an EDA tool executed on a first computer system. The program file generated may be transmitted to a second computer system to allow the design of the system to be further processed. The program file may be transmitted from either the first or second computer system onto the target device and used to program the target device according to the system design. It should be appreciated that the design of the system may also be output in other forms such as on a display device or other medium. The target device may be programmed with the program file. By programming the target with the program file, components (programmable resources) on the target device are physically transformed to implement the system.

It should be appreciated that embodiments of the present disclosure may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 12:
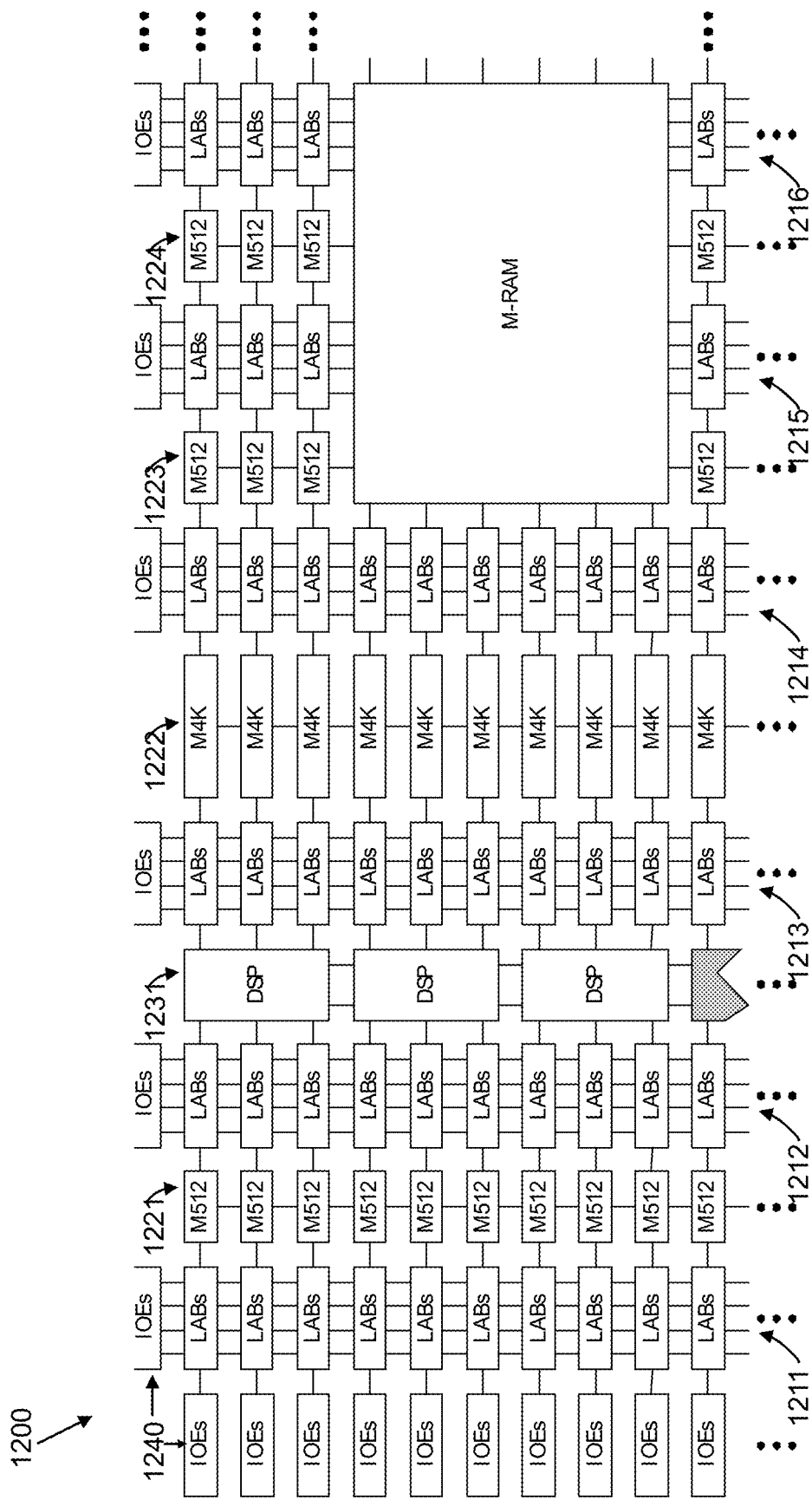
FIG. 12 illustrates an exemplary target device according to an exemplary embodiment of the present disclosure.

FIG. 12 illustrates a device 1200 that may be used to implement a target device according to an embodiment of the present disclosure. The device may be implemented on a die, as discussed above. The device 1200 is a field programmable gate array (FPGA) that includes a plurality of logic-array blocks (LABs). According to an embodiment of the present disclosure, the device 1200 may be implemented on a single integrated circuit. Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present disclosure, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input LUT with a configurable register. According to an embodiment of the present disclosure, the logic block may be implemented by an adaptive logic module (ALM), such as those found in Stratix devices manufactured by Altera Corporation which is wholly owned by Intel Corporation. LABs are grouped into rows and columns across the device 1200. Columns of LABs are shown as 1211-1216. It should be appreciated that the logic block may include additional or alternate components. It should be appreciated that a carry chain may be implemented with the resources of one or more LABs in the device 1200.

The device 1200 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 1200. Columns of memory blocks are shown as 1221-1224.

The device 1200 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 1200 and are shown as 1231. It should be appreciated that the portion of the target device 600 illustrated in FIG. 6 may be implemented with the programmable resources illustrated in FIG. 12, such as the columns of LABs 1211-1216 and columns of DSP blocks 1231.

The device 1200 includes a plurality of input/output elements (IOEs) 1240. Each IOE feeds an IO pin (not shown) on the device 1200. The IOEs 1240 are located at the end of LAB rows and columns around the periphery of the device 1200. Each IOE may include a bidirectional IO buffer and a plurality of registers for registering input, output, and output-enable signals.

The device 1200 may include routing resources such as LAB local interconnect lines, row interconnect lines ("H-type wires"), and column interconnect lines ("V-type wires") (not shown) to route signals between components on the target device.

The following examples pertain to further embodiments. In one embodiment, a method for designing a system on a FPGA includes identifying a portion of the system that is implemented greater than a predetermined number of times, generating a structural netlist that describes how to implement the portion of the system a plurality of times on the FPGA and that leverages a repetitive nature of implementing the portion, wherein the identifying and generating is performed prior to synthesizing and placing other portions of the system that are not implemented greater than the predetermined number of time, synthesizing, placing, and routing the other portions of the system on the FPGA in accordance with the structural netlist, and configuring the FPGA with a configuration file that includes a design for the system that reflects the synthesizing, placing, and routing, wherein the configuring physically transforms resources on the FPGA to implement the system.

In a further embodiment, the method wherein generating the structural netlist comprises constructing a leaf that includes a densely packed structural netlist of the portion that utilizes more than a predetermined percentage of resources occupying an area of the leaf.

In a further embodiment, the method further comprising identifying a plurality of different functionally equivalent design variations for implementing the leaf on the FPGA.

In a further embodiment, the method wherein the plurality of different design variations for implementing the leaf includes a first variation that utilizes only logic array blocks, a second variation that utilizes a first combination of logic array blocks and digital signal processing blocks, and a third variation that utilizes a second combination of logic array blocks and digital signal processing blocks.

In a further embodiment, the method further comprising generating a layout of a plurality of leaves on the FPGA.

In a further embodiment, the method wherein generating the layout accounts for a flow of data into and out of the system.

In a further embodiment, the method wherein generating the layout comprises determining which of the plurality of different functionally equivalent design variations for implementing the leaf on the FPGA are to be used for the layout of the plurality leaves.

In a further embodiment, the method wherein generating the layout comprises utilizing each of the plurality of different functionally equivalent design variations for implementing the leaf on the FPGA for the layout of the plurality leaves.

In a further embodiment, the method further comprising modifying the layout to account for discontinuities on the FPGA.

In a further embodiment, the method further comprising modifying the layout to reduce congestion.

In a further embodiment, the method wherein the congestion is measured using a number of inputs and outputs, a total area of the one of the leaves, a hamming weight, and a Manhattan distance of one of the plurality of leaves.

In a further embodiment, the method further comprising replicating the modified layout for the design of the system.

In a further embodiment, the method further comprising identifying a second portion of the system that is implemented greater than the predetermined number of times, and generating another structural netlist that describes how to implement the second portion of the system a plurality of times on the FPGA and that leverages a repetitive nature of implementing the second portion, wherein the identifying and generating is performed prior to synthesizing and placing other portions of the system that are not implemented greater than the predetermined number of time.

In a further embodiment, the method wherein the portion comprises a processor.

In a further embodiment, the method wherein the portion comprises a memory.

In a further embodiment, the method wherein the portion comprises a logic function.

In a further embodiment, a non-transitory computer readable medium including a sequence of instructions stored thereon for causing a computer to execute a method for designing and configuring a system on a field programmable gate array (FPGA) that includes identifying a first portion of the system that is implemented greater than a predetermined number of times, generating a structural netlist that describes how to implement the first portion a plurality of times on the FPGA and that leverages a repetitive nature of implementing the portion, identifying a second portion of the system that is implemented greater than the predetermined number of times, generating another structural netlist that describes how to implement the second portion of the system a plurality of times on the FPGA and that leverages a repetitive nature of implementing the second portion, wherein the identifying and generating is performed prior to synthesizing and placing other portions of the system that are not implemented greater than the predetermined number of time.

In a further embodiment, the non-transitory computer readable medium, wherein the method further comprises synthesizing, placing, and routing the system on the FPGA in accordance with the structural netlist and the another structural netlist, and configuring the FPGA with a configuration file that includes a design for the system that reflects the synthesizing, placing, and routing, wherein the configuring physically transforms resources on the FPGA to implement the system.

In a further embodiment, a system designer for designing and configuring a system on a field programmable gate array (FPGA) includes a synthesis for embedded feature placement (SEFP) unit that identifies a portion of the system that is implemented greater than a predetermined number of times, and that generates a structural netlist that describes how to implement the portion of the system a plurality of times on the FPGA by leveraging a repetitive nature of implementing the portion, wherein the identifying and generating is performed prior to synthesizing and placing other portions of the system that are not implemented greater than the predetermined number of time. The system designer includes a synthesis unit that synthesizes other portions of the system on the FPGA with the portion of the system in accordance with the structural netlist. The system designer includes a placement unit that places the other portions of the system with the portion of the system on the FPGA in accordance with the structural netlist. The system designer includes an assembly unit that configures the FPGA with a configuration file that includes a design for the system that reflects the synthesizing and placing, wherein the configuring physically transforms resources on the FPGA to implement the system.

In a further embodiment, the system designer, wherein the SEFP unit comprises a leaf function construction unit that constructs a leaf that includes a densely packed structural netlist of the portion that utilizes more than a predetermined percentage of resources occupying an area of the leaf.

In a further embodiment, the system designer, wherein the leaf function construction unit further identifies a plurality of different functionally equivalent design variations for implementing the leaf on the FPGA.

In a further embodiment, the system designer, wherein the plurality of different design variations for implementing the leaf includes a first variation that utilizes only logic array blocks, a second variation that utilizes a first combination of logic array blocks and digital signal processing blocks, and a third variation that utilizes a second combination of logic array blocks and digital signal processing blocks.

In a further embodiment, the system designer, further comprising a high-level layout unit that generates a layout for a plurality of leaves on the FPGA, and that determines which of the plurality of different functionally equivalent design variations for implementing the leaf on the FPGA are to be used for the layout for the plurality leaves.

In the foregoing specification, embodiments of the disclosure have been described with reference to specific exemplary embodiments thereof. It will, however, be evident that various modifications and changes may be made thereto without departing from the broader spirit and scope of the embodiments of the disclosure. The specification and drawings are, accordingly, to be regarded in an illustrative rather than restrictive sense.

What is claimed is:

1. A method for designing and configuring a system on a field programmable gate array (FPGA), comprising:
   identifying a portion of the system that is implemented greater than a predetermined number of times;
   generating a structural netlist that describes how to implement the portion of the system a plurality of times on the FPGA and that leverages a repetitive nature of implementing the portion, wherein the identifying and generating is performed prior to synthesizing and placing other portions of the system that are not implemented greater than the predetermined number of time;
   synthesizing, placing, and routing the other portions of the system on the FPGA in accordance with the structural netlist; and
   configuring the FPGA with a configuration file that includes a design for the system that reflects the synthesizing, placing, and routing, wherein the configuring physically transforms resources on the FPGA to implement the system.

2. The method of claim 1, wherein generating the structural netlist comprises constructing a leaf that includes a densely packed structural netlist of the portion that utilizes more than a predetermined percentage of resources occupying an area of the leaf.

3. The method of claim 2 further comprising identifying a plurality of different functionally equivalent design variations for implementing the leaf on the FPGA.

4. The method of claim 3, wherein the plurality of different design variations for implementing the leaf includes a first variation that utilizes only logic array blocks, a second variation that utilizes a first combination of logic array blocks and digital signal processing blocks, and a third variation that utilizes a second combination of logic array blocks and digital signal processing blocks.

5. The method of claim 3 further comprising generating a layout of a plurality of leaves on the FPGA.

6. The method of claim 5, wherein generating the layout accounts for a flow of data into and out of the system.

7. The method of claim 5, wherein generating the layout comprises determining which of the plurality of different functionally equivalent design variations for implementing the leaf on the FPGA are to be used for the layout of the plurality leaves.

8. The method of claim 5, wherein generating the layout comprises utilizing each of the plurality of different functionally equivalent design variations for implementing the leaf on the FPGA for the layout of the plurality leaves.

9. The method of claim 5 further comprising modifying the layout to account for discontinuities on the FPGA.

10. The method of claim 5 further comprising modifying the layout to reduce congestion.

11. The method of claim 10, wherein the congestion is measured using a number of inputs and outputs, a total area of the one of the leaves, a hamming weight, and a Manhattan distance of one of the plurality of leaves.

12. The method of claim 9 further comprising replicating the modified layout for the design of the system.

13. The method of claim 1 further comprising:
    identifying a second portion of the system that is implemented greater than the predetermined number of times;
    generating another structural netlist that describes how to implement the second portion of the system a plurality of times on the FPGA and that leverages a repetitive nature of implementing the second portion, wherein the identifying and generating is performed prior to synthesizing and placing other portions of the system that are not implemented greater than the predetermined number of time.

14. The method of claim 1, wherein the portion comprises a processor.

15. The method of claim 1, wherein the portion comprises a memory.

16. The method of claim 1, wherein the portion comprises a logic function.

17. A non-transitory computer readable medium including a sequence of instructions stored thereon for causing a computer to execute a method for designing and configuring a system on a field programmable gate array (FPGA), comprising:
    identifying a first portion of the system that is implemented greater than a predetermined number of times;
    generating a structural netlist that describes how to implement the first portion a plurality of times on the FPGA and that leverages a repetitive nature of implementing the portion;

identifying a second portion of the system that is implemented greater than the predetermined number of times; and generating another structural netlist that describes how to implement the second portion of the system a plurality of times on the FPGA and that leverages a repetitive nature of implementing the second portion, wherein the identifying and generating is performed prior to synthesizing and placing other portions of the system that are not implemented greater than the predetermined number of time.

18. The non-transitory computer readable medium of claim 17, wherein the method further comprises:

synthesizing, placing, and routing the system on the FPGA in accordance with the structural netlist and the another structural netlist; and configuring the FPGA with a configuration file that includes a design for the system that reflects the synthesizing, placing, and routing, wherein the configuring physically transforms resources on the FPGA to implement the system.

19. A system designer for designing and configuring a system on a field programmable gate array (FPGA), comprising:

a synthesis for embedded feature placement (SEFP) unit that identifies a portion of the system that is implemented greater than a predetermined number of times, and that generates a structural netlist that describes how to implement the portion of the system a plurality of times on the FPGA by leveraging a repetitive nature of implementing the portion, wherein the identifying and generating is performed prior to synthesizing and placing other portions of the system that are not implemented greater than the predetermined number of time;

a synthesis unit that synthesizes other portions of the system on the FPGA with the portion of the system in accordance with the structural netlist;

a placement unit that places the other portions of the system with the portion of the system on the FPGA in accordance with the structural netlist; and an assembly unit that configures the FPGA with a configuration file that includes a design for the system that reflects the synthesizing and placing, wherein the configuring physically transforms resources on the FPGA to implement the system.

20. The system designer of claim 19, wherein the SEFP unit comprises a leaf function construction unit that constructs a leaf that includes a densely packed structural netlist of the portion that utilizes more than a predetermined percentage of resources occupying an area of the leaf.

21. The system designer of claim 20, wherein the leaf function construction unit further identifies a plurality of different functionally equivalent design variations for implementing the leaf on the FPGA.

22. The system designer of claim 21, wherein the plurality of different design variations for implementing the leaf includes a first variation that utilizes only logic array blocks, a second variation that utilizes a first combination of logic array blocks and digital signal processing blocks, and a third variation that utilizes a second combination of logic array blocks and digital signal processing blocks.

23. The system designer of claim 22 further comprising a high-level layout unit that generates a layout for a plurality of leaves on the FPGA, and that determines which of the plurality of different functionally equivalent design variations for implementing the leaf on the FPGA are to be used for the layout for the plurality leaves.

* * * * *